May 8, 1951
C. C. FUERST
2,552,273
BUILT-IN FLASH SYNCHRONIZER HAVING
TWO SWITCHES FOR SELECTIVE USE
Filed Nov. 22, 1947
5 Sheets-Sheet 3
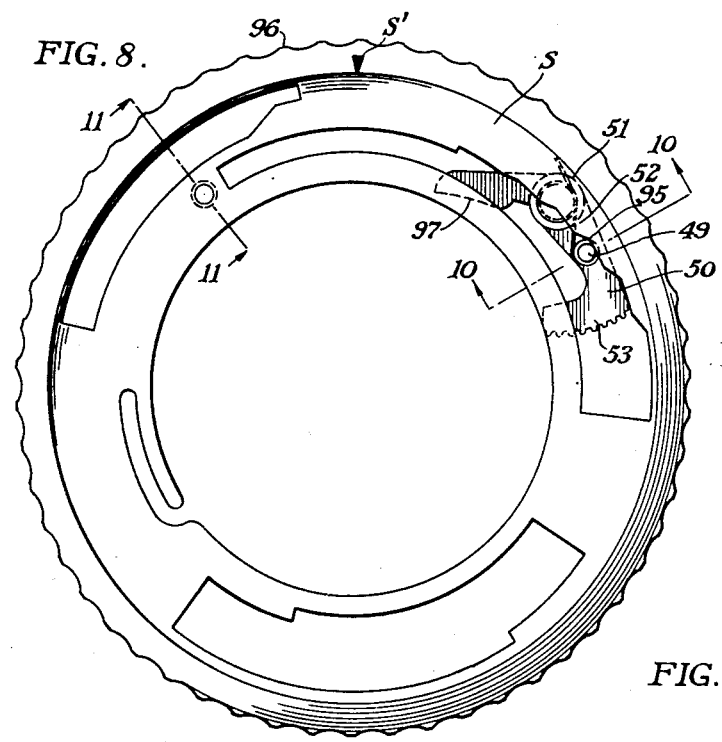
FIG. 8.
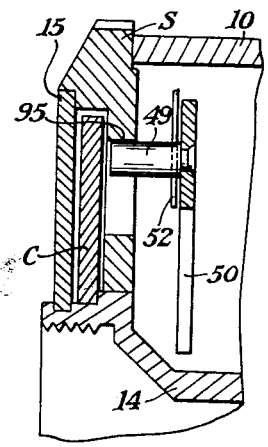
FIG. 10.
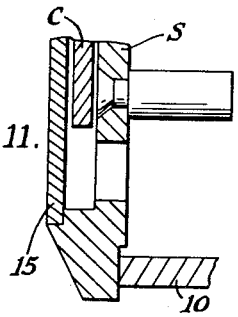
FIG. 11.
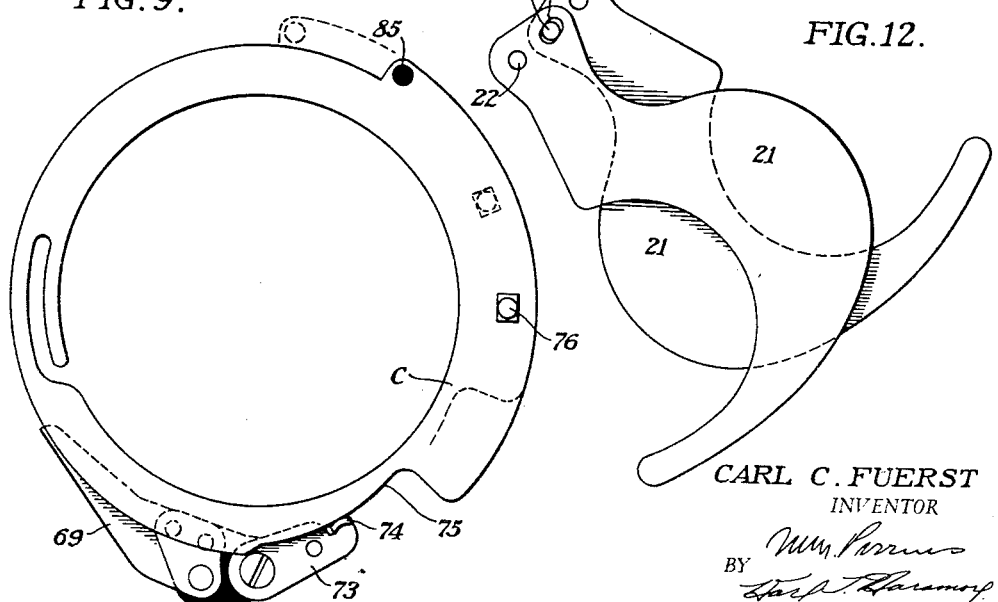
FIG. 9.
FIG. 12.
CARL C. FUERST
INVENTOR
BY
ATTORNEYS

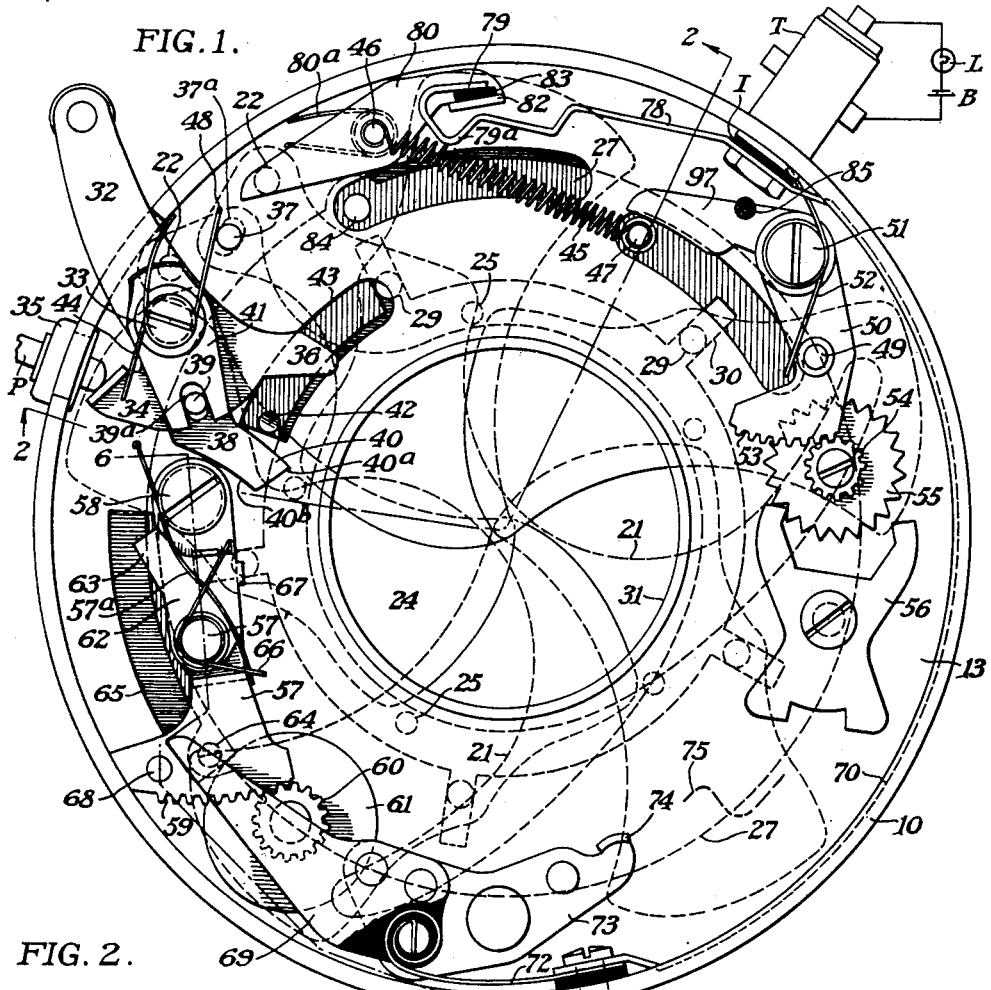

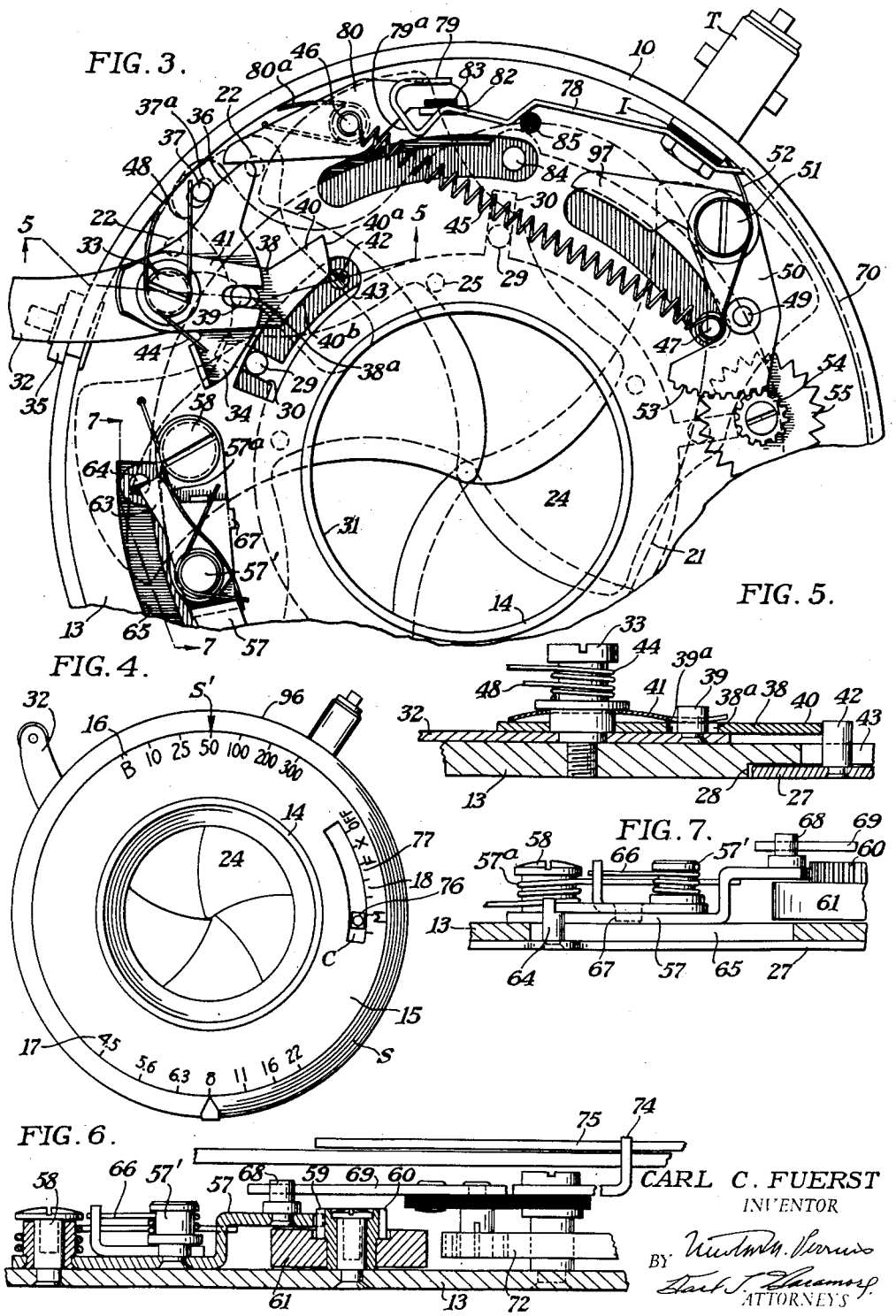

CARL C. FUERST
INVENTOR

Patented May 8, 1951

2,552,273

UNITED STATES PATENT OFFICE 2,552,273

BUILT-IN FLASH SYNCHRONIZER HAVING TWO SWITCHES FOR SELECTIVE USE

Carl C. Fuerst, Rochester, N. Y., assignor to Eastman Kodak Company, Rochester, N. Y., a corporation of New Jersey Application November 22, 1947, Serial No. 787,600

4 Claims. (Cl. 95—11.5)

The present invention relates to flash synchronizers and particularly to a flash synchronizer built into a photographic shutter of the between-the-lens type.

The flash synchronizer of this invention is particularly designed for use with, and forms a part of, a photographic shutter of the between-the-lens type in which the shutter blades are opened and closed to make an exposure by movement of a spring-driven oscillatable blade controller ring in one direction from its cocked to its released position. Shutters having a blade-operating mechanism of this nature are completely disclosed in my copending U. S. patent applications Serial Nos. 728,528 and 749,482, filed February 14, 1947, and March 21, 1947, now Patent Nos. 2,524,786 and 2,511,201, respectively; the first-mentioned application relating to a shutter of the setting type, while the other relates to one of the automatic type. The present invention shows a flash synchronizer in combination with both of these shutters.

One object of the present invention is to provide a built-in flash synchronizer which comprises two switches; one for use with flash lamps having conventional "lags," and the other for use with flash lamps of the gaseous discharge type which have no "lag"; and including adjusting means by which each of the switches may be selectively used independently of the other, or both switches may be rendered inoperative if the shutter is to be used for normal daylight photography with a flash lamp in the circuit.

Another object is to provide a built-in flash synchronizer of the type set forth including means for preventing either of the switches from being prematurely closed during the tensioning of the shutter whereby the shutter may be tensioned with a good lamp in the flash circuit.

And, still another object is to provide a built-in flash synchronizer of the type set forth which includes a normally opened switch which is closed directly by operation of the blade-control ring in moving from a tensioned position and in proper timed relation with the opening of the shutter blades to insure synchronism; and in which the driving connection between the movable member of the switch and the blade ring is broken before the blade ring actually opens the blades so that the blade ring is not retarded by this added work during the part of the movement of the shutter blades which controls the exposure.

And yet, another object is to provide a flash synchronizer of the type set forth wherein the connection between the blade-control ring and the movable contact of the flash switch is in the nature of a one-way clutch which prevents closing of the switch during cocking of the shutter.

And, a further object is to provide a flash synchronizer of the type set forth which includes a second switch connected in the flash circuit in parallel with the first switch and which closes when the shutter blades reach their full-open position, one contact of the second switch constituting a part of the driving connection between the blade ring and the movable member of the first switch; and the second switch being normally held in a switch-open position at all times when the shutter is not cocked by the movable member of the first switch so that the second switch cannot be closed during the cocking of the shutter.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a front elevation of an automatic shutter having a built-in synchronizer constructed in accordance with the present invention, the shutter cover plates being removed exposing the shutter mechanism and the parts being shown in a normal position of rest;

Fig. 2 is a section taken on line 2—2 of Fig. 1;

Fig. 3 is a fragmentary view, like Fig. 1, with the parts in a different position. Here, the shutter trigger has been almost fully depressed and an exposure will occur when the trigger is moved slightly further through its path of movement;

Fig. 4 is a front elevation of the shutter shown in the preceding figures, but with the cover plates in place;

Fig. 5 is an enlarged fragmentary section taken on line 5—5 of Fig. 3 showing a portion of the shutter trigger mechanism;

Fig. 6 is an enlarged fragmentary section through a portion of the flash lamp synchronizing mechanism and taken substantially on line 6—6 of Fig. 1;

Fig. 7 is an enlarged fragmentary detailed section, parts being shown in elevation, taken on line 7—7 of Fig. 3;

Fig. 8 is a top plan view of the speed-adjusting cam plate removed from the shutter but showing its relationship to a portion of the gear retard;

Fig. 9 is an enlarged top plan view of the synchronizer-adjusting cam removed from the shutter;

Fig. 10 is an enlarged sectional detail taken on line 10—10 of Fig. 8;

Fig. 11 is a frgamentary detailed section taken on line 11—11 of Fig. 8;

Fig. 12 is a top plan view of the cover blinds shown in their operative or closed position and removed from the shutter;

Like reference characters refer to corresponding parts throughout the drawings.

Figure 13:
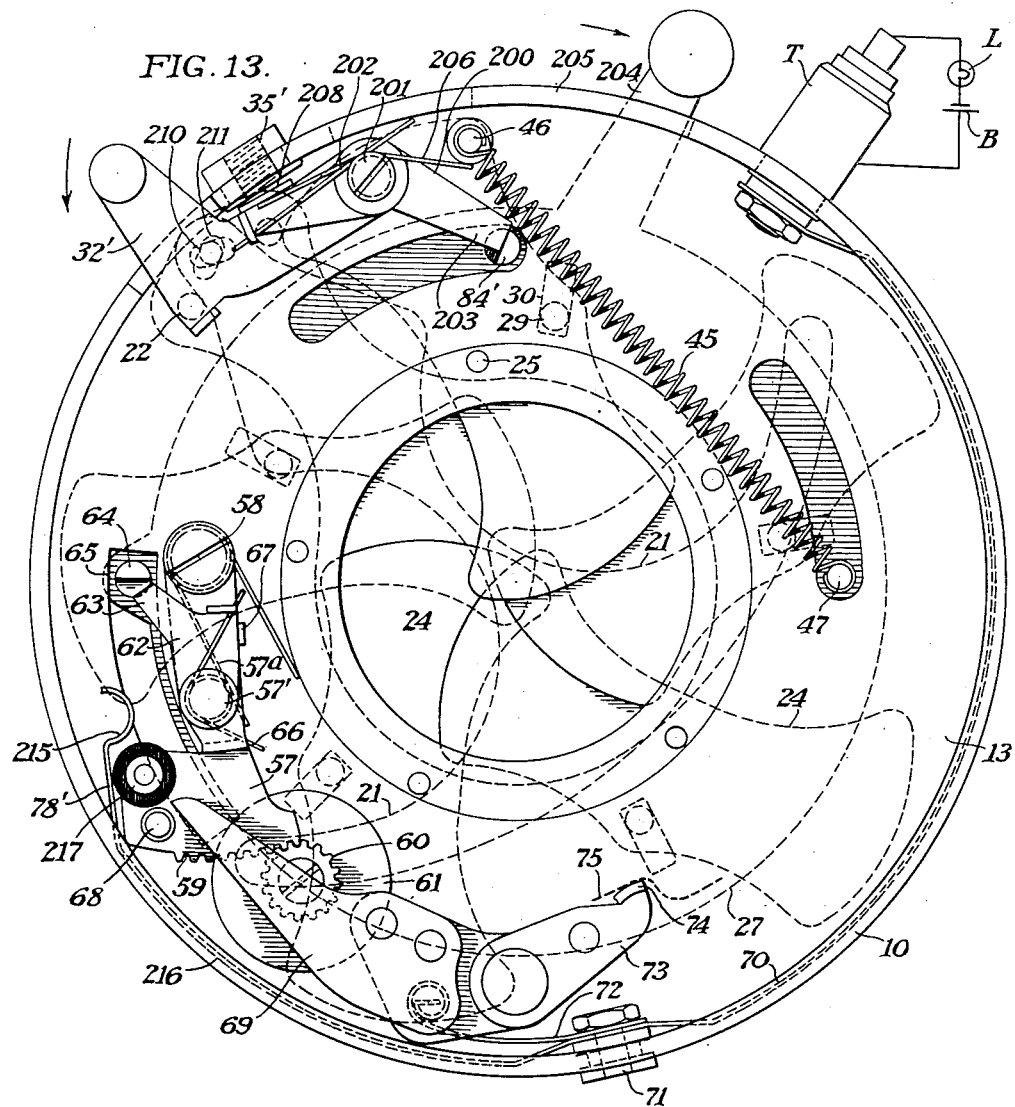
Fig. 13 is a fragmentary view of a shutter of the set type and incorporating a flash synchronizer, said shutter being shown with the parts in a set condition.

The illustrated embodiment of my invention in Figs. 1–12 shows a shutter of the automatic type, that is, a shutter in which movement of the trigger in one direction both cocks and releases the shutter in moving through its path of movement from its rest position to its shutter-releasing position.

The shutter blades are of the symmetrical double-ended type. A series of these blades are swung from closed-to-open-to-closed position moving in one direction during the cocking operation, and then in a reverse direction for the exposure operation, going from closed-to-open-to-closed in the opposite direction. Because the blades go through an open position during the cocking movement, "cover-blinds" must be provided which remain closed during the cocking movement but open just before the release movement begins, and again close after the exposure is completed.

The illustrated preferred embodiment of my shutter, as shown particularly in Fig. 2, has the usual cup-like circular casing with an upstanding rim 10, a back portion 11, and a threaded collar 12, Fig. 2, adapted to receive one member of a lens and to be attached to a camera. The casing may have a mechanism plate 13, and a forward annular extension 14 of this plate constitutes another mount for a lens element and a center for the front cover 15, which latter may be provided with indicia 16, 17, 18, Fig. 4, correlated respectively with shutter speeds, diaphragm apertures, and synchroflash settings. The cover 15 is fixed in the collar 14 and serves to center a ring or collar S, which is revoluble about said cover, so that an index mark S' may be brought into register with any character on scale 16. S is therefore the speed-setting member, and is shown disassembled from the shutter in Fig. 8.

The diaphragm blades 19, Fig. 2, and the ring 20 for operating them, form no part of the present invention. However, these are indicated as lying within a recess adjacent the back 11 of the shutter casing. The cover-blinds 21, best shown in Fig. 12, are mounted on pivots 22 to be swung in opposite directions simultaneously as will be further described. In front of the cover-blinds is a fixed plate 23, Fig. 2, attached to the mechanism plate 13 and constituting a support for the symmetrical shutter blades 24, each of which is pivotally mounted in plate 23 at 25. A second fixed plate 26 overlies plate 23 and serves as a front confining member for the shutter blades.

The shutter blades 24 are moved clockwise or counterclockwise by means of an operating ring-plate 27, lying in an annular recess 28, Figs. 2 and 5, in the mechanism plate, and hereinafter referred to as the blade ring. Each shutter blade is connected with the ring 27 by a pin 29, working in a slot 30, as shown in Fig. 1.

If the ring 27 is rotated clockwise from the position of Fig. 1 the blades 24 will be turned in the same direction about their pivots 25. The first portion of this movement uncovers the exposure aperture 31 and the latter portion of the movement carries the blades to the position of Fig. 3 to again cover the exposure aperture. If the ring 27 is rotated counterclockwise from the position of Fig. 3, the blades 24 also move counterclockwise about their pivots 25 and uncover and then cover the aperture 31. If the cover-blinds 21 are closed, no exposure will result. Therefore, means are provided whereby during the clockwise or cocking movement of the shutter blades 24, the cover-blinds 21 are closed, as in Fig. 1, and during the counterclockwise or exposure movement of the shutter blades the cover blinds are separated as in Fig. 3, leaving the aperture 31 unobstructed.

The mechanism for accomplishing the results above outlined comprises a trigger having a finger piece 32, a pin 42 on the blade ring engageable thereby, a motor-spring 45 for moving the blade ring when the latter is released, and other associated elements about to be described in detail.

The trigger is constructed of several parts, best shown in Figs. 1 and 5. The finger piece 32 is pivotally mounted on a stud 33. An extension 34 is provided for operation by a cable release, the plunger P of which may operate through a bushing 35. A second arm 36 extends toward aperture 31 when the trigger is in a rest position and is adapted to open the cover-blinds 21 when the trigger is depressed to the Fig. 3 position by contacting the pin 37 which is carried by one cover blind and which passes through an aperture 37a in the other cover-blind, as in Fig. 12. As shown in Fig. 5, a secondary lever 38 is pivoted on stud 33 and overlies the trigger 32 and is constrained to move with the latter by reason of a pin 39 which extends from the trigger through a slot 38a in the lever 38, and into a notch 39a in a flat spring 41 that tends to resiliently urge the end 40 of lever 38 toward the mechanism plate 13 so that it may engage a pin 42 projecting from the blade-operating ring 27 through a slot 43 in the mechanism plate.

When the trigger 32 is depressed, against the action of a spring 44, which holds the trigger in its rest position, Fig. 1, the cam end 40 of lever 38 engages pin 42 and thereby rotates blade ring 27 clockwise, which causes the shutter blades also to rotate clockwise and uncover aperture 31. Thus, the arm 38 has a cam 40 extending away from stud 33 for moving pin 42 in a clockwise direction. As the trigger is further depressed the blades 24 close the aperture, as in Fig. 3. During this clockwise movement the master or motor spring 45, which is anchored on a fixed pin 46 and connected to a pin 47 on the blade ring 27, is fully tensioned. Fig. 3 shows the parts about to be released.

Near the last portion of the depressing movement of the trigger 32, the upper edge of the extension 36 meets pin 37 and the cover blinds 21 are opened by a very slight further movement of the trigger, against the resistance of a closing spring 48. At the beginning of this slight movement the shutter blades 24 are still fully closed, as in Fig. 3, and are held closed by the cam 40a on the extreme end of the secondary lever 38, which is curved concentrically with pivot 33. There will be no further movement of the shutter blades in either direction until the cam 40a completely passes and slips off from the pin 42.

As soon as the pin 42 is clear, spring 45 urges the blade ring 27 counterclockwise and the shutter blades begin to open. It should be noted that the portion 40 of lever 38 has an edge cam 40b so formed that it lies in a curve concentric with the blade ring and the path of pin 42 when the trigger is depressed. Therefore, levers 38 and 32 cannot be returned to their normal (Fig. 1) positions until the pin 42 has moved past the edge cam 40b, or until the shutter blades have almost completed their counterclockwise movement from the closed position of Fig. 3 through full-open, to closed position again as in Fig. 1. Because of this preventive measure, the end 36 of trigger 32 remains in contact with pin 37 and holds the cover-blinds 21 open until the shutter is almost closed after the exposure.

When the operator lifts his finger, trigger 32 and lever 38 are turned clockwise by spring 44.

The outer end of pin 42 is beveled in such a manner that end 40 of lever 38 may ride up over it, because of spring 41, and move to a position below the pin as in Fig. 1, where it is ready for a succeeding operation.

A "retard" mechanism may be provided, to delay the closing of the shutter blades when they are fully open in the exposure position. This mechanism may include a bell-crank 50 pivoted at 51 and urged counterclockwise by a spring 52 pressing against a pin 49. This pin may be acted on by a cam 95, Fig. 8 and Fig. 10, which in a well-known manner sets the bell-crank in various positions as the ring S is turned by its roughened edge 96. It may be displaced accordingly by the pin 47 of blade ring 27 striking arm 97 during the counterclockwise movement of the blade ring. The bell crank 50 and its gear train may therefore retard ring 27 and a pallet 56 increases this retarding effect. This pallet 56 operates in conjunction with a star-wheel 55, pinion 54, and gear segment 53, to create the retard or time-delay above mentioned.

A "flash synchronizing" mechanism is also provided in the shutter as herein illustrated, this mechanism being somewhat similar to that shown in my pending application Serial No. 737,351, filed March 20, 1947, but differing in operation therefrom in the specific mechanism.

A connector terminal T, Fig. 1, is provided for receiving current from a battery B which may be mounted in a suitable flashholder with a flashlamp L. The shell of the terminal is grounded on the casing rim 10 and the center post, insulated at I, is connected to an insulated metal strip 70 lying in a recess in the rim 10 and fastened to the latter by a second insulated post 71.

The mechanism for closing the circuit through lamp L at the instant the shutter is fully open is best shown in Fig. 1. A lever 57, pivoted at 58, has a gear segment 59 at its lower end, meshing with a pinion 60, on the shaft of which is mounted an inertia member 61. An auxiliary lever 62 is mounted on lever 57 at 57' and has a portion 63 that projects into the path of a shouldered pin 64 in blade ring 27, said pin extending forwardly through a slot 65 in the mechanism plate 13. When the blades 24 and blade ring 27 have been moved to the position of Fig. 3, that is, just prior to the disengagement of lever end 40a from pin 42, the shouldered pin 64 displaces lever 62 against the resistance of a light spring 66 and comes to rest above the upper end 63 of the lever, as in Fig. 3.

When the blade ring is free to be moved counterclockwise by spring 45 to produce an exposure, as previously described, the pin 64 drives levers 62 and 57 together against the action of a heavier spring 57a, by reason of lug 67 engaging the right side of lever 57, and, in so doing, moves segment 59 and inertia member 61. A pin 68 on lever 57 then strikes a contact lever 69 and completes the flash lamp circuit through a resilient strip 72 which is connected to strip 70 at post 71. Lever 69 is fixed to but insulated from a positioning member 73, which has an upstanding lug 74 movable by a control cam 75 indicated in broken lines in Fig. 1. The time interval between the release of pin 42 and the closing of the circuit through pin 68 and contact lever 69 is variable in accordance with the lag characteristics of different flash bulbs, by means of a finger piece 76 set in the control cam 75 carried by ring C, Fig. 9, and accessible through a slot 77 in the plate 16. This mechanism in part resembles the mechanism shown in my copending application 737,351, above referred to.

To enable the shutter to be used with flash apparatus of the gaseous activated type such as the well-known vapor discharge type of instantaneous flashlamp, an extension 78 of the strip 70 extends from terminal post T and its end is recurved at 79 to a hooklike shape. A lever 80, pivoted on the pin 46, is adapted to be struck and turned clockwise by the end 36 of trigger 32 each time the latter is fully depressed, the lever 80 is urged counterclockwise by a spring 80a, and a lug 82 upturned from its right end carries an insulating block 83 that normally raises the extension 78 so that the knuckle portion 79a thereof is out of the path of a pin 84 carried by blade ring 27. This pin, when it contacts the portion 79a, serves as a ground connection through the terminal T and a gaseous discharge lamp which may be substituted for the lamp I. However, the pin 84 will be contacted by the knuckle 79a only after the shutter is cocked and released, on high-speed operation, that is, while lever 80 is held by trigger end 36 in its extreme clockwise position, and while pin 68 is prevented from contacting lever 69.

The vapor discharge type of flash is usable only when the finger-piece 76 is moved in slot 77 to the X position shown in Fig. 4. At this time, a block of insulating material 85, which moves with the finger-piece 76 being carried by ring C (Fig. 9) and indicated in broken lines in Fig. 1, will be moved so far toward the right with reference to Fig. 3 that it will permit knuckle 79a to drop into the path of pin 84, and when the latter moves to the left the circuit will be closed.

It should be especially noted that when trigger 32 is depressed arm 38 engages and moves pin 42 and gradually tensions the spring 45 before the slip-off time arrives, Fig. 3. When surface 40a of arm 38 comes into engagement with pin 42, the pin remains substantially stationary while arm 36 engages pin 37 and opens cover-blinds 21. Thus, the force required to operate trigger 32 is not suddenly reduced to zero but is in part counteracted by the increasing tension of trigger spring 44 and cover-blind spring 48. Also, the trigger arm 36 operates lever 80 against its spring 80a. Thus, all of these springs tend to prevent a sudden shock to the shutter mechanism due to the trigger tension suddenly being released by slipping off pin 42.

In working out the flash synchronizing mechanism the travel of pin 64 is carefully correlated with the travel of the pin 42 under the setting movement of trigger arm 38 so that pin 64 may just snap behind latch 63 when the blade ring is in its maximum clockwise position and is fully set and about to be released. The movement of sector 57 through the action of latch 63 takes place before the blade ring 27 has moved far enough to open the shutter blades 24. The overlap of the blades requires considerable movement before light starts to enter and this is utilized for the synchronizer timing.

The present invention can just as well be applied to a shutter of the set type as to a shutter of the automatic type described above, and in Figs. 13 and 14 I have disclosed such a modification of the present invention. The only difference between a shutter of the set type and one of the automatic type is that in the former case the shutter mechanism is cocked by a lever independent of the trigger and is held in a cocked position by a latch which is later released by the trigger, whereas in an automatic shutter the trigger serves to both cock and release the shutter when manually operated. The above-described automatic shutter is readily modified to become one of the set type, the only requirement being that a setting arm be attached to the blade controller ring and a latch be provided to hold the ring in a set position which latch can be selectively released by the shutter trigger. The cover blinds, instead of being operated by the shutter blades, are connected to the trigger to be opened just prior to the release of the shutter by the trigger. Such a modification of the present invention will now be described, and because the majority of the parts in this second shutter are the same as in the automatic one, described above, like parts will be referred to by the same reference characters while the equivalent parts will be referred to by the same reference characters primed (').

Figure 14:
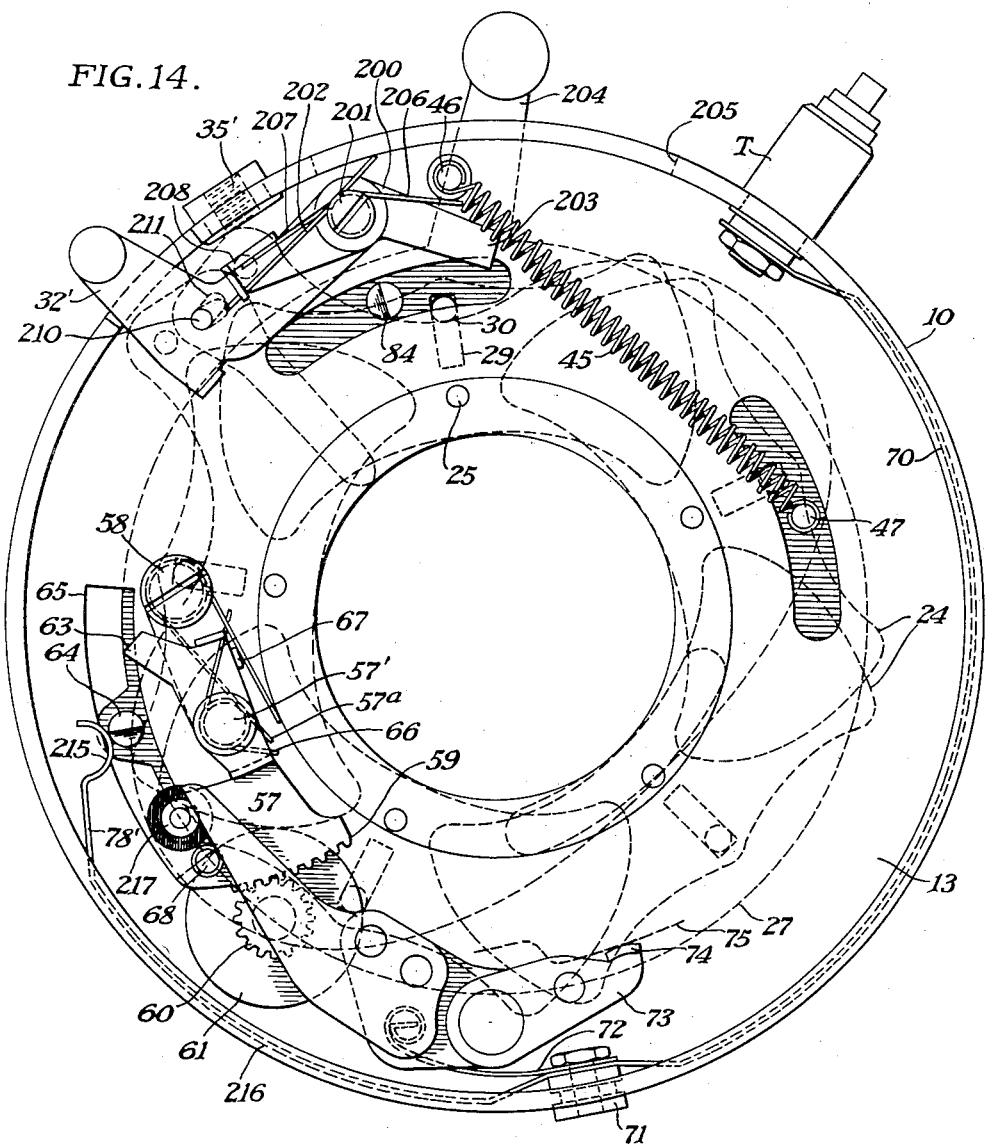
Fig. 14 is a view similar to Fig. 13 but showing the shutter parts in the position they assume after release and when the shutter blades are in their full-open position.

Referring now to Figs. 13 and 14, the shutter, modified to become one of the set type, includes the cover blinds 21 mounted on pivots 22, to be swung in opposite directions simultaneously, and symmetrical shutter blades 24, each of which is pivotally mounted in plate 23 at 25, as before. The shutter blades are moved clockwise, or counterclockwise, by means of an operating ring plate, or blade-controller ring 27, each shutter blade being connected to the ring 27 by a pin 29 working in a slot 30, as shown and described above. As in the automatic shutter, the blade ring 27 is adapted to be driven counterclockwise by the power spring 45 connected at one end to a pin 46 on the mechanism plate 13 and at the other end to a pin 47 in the blade ring to make an exposure. This shutter differs from the automatic one in that pin 47 is moved farther to the right on blade ring 27 to permit the use of a longer power spring 45, whereby more power may be obtained from this spring. This difference will be noted by comparing Figs. 1 and 13 and a comparison of the two figures will show that this modification results in a greater overlap of the shutter blades in the set position of the shutter. While this distinction between the two shutters has nothing to do with the present invention, the latter arrangement results in a shutter blade construction which is more apt to be completely light-tight in a cocked position, and one wherein more driving power for the blades is obtained.

To make the shutter one of the set type, a double-ended latch member 200 is pivoted on a stud 201 and normally held in the position shown in Fig. 13 by a spring 202. One end 203 of latch member 200 is adapted to engage a flat side on pin 84' connected to the blade ring when the latter is set and to hold the blade ring in a cocked position. The blade ring 27 is provided with a setting arm 204 which extends radially therefrom through a circumferential slot 205 in the rim 10 of the shutter casing. When the arm 204 is manually moved counterclockwise to the position shown in Fig. 13, the shutter is set and is held in a set condition by latch member 200 engaging pin 84' on the ring.

The blade ring is released from its cocked position by the trigger 32', but since all the trigger has to do, in this instance, is to release the latch member 200, it is modified somewhat over the trigger shown in Fig. 1. Here, the trigger is pivoted on stud 201 and normally spring-pressed to its inoperative position (see Fig. 13) by a spring 206; one end 207 of which underlies a lug 208 extending perpendicularly from the trigger in overlying relation with the edge of the latch member. This lug also provides a surface against which the end of a cable release (not shown) will act when the cable release is screwed into the cable release socket 35' located in the rim of the shutter. When the trigger 32' is manually depressed in the direction of the arrow in Fig. 13, the lug 208 thereon will cause the latch member 200 to be pivoted in a counterclockwise direction until its end 203 releases pin 84' on the blade ring, whereupon the ring will start to move counterclockwise under the action of power spring 45 and cause the shutter blades to open and close to make an exposure. Immediately after the blade ring has been released, the trigger 32' may be released and allowed to return to its normal position under the action of spring 207. At the same time, latch member 200 returns to its normal position under the action of spring 202. When the shutter is subsequently set by moving the blade ring 27 clockwise through the use of setting arm 204, the pin 84' will pass by the end 203 of latch member 202 pivoting the latter counterclockwise independently of trigger 32' until the pin 84' is again latched behind the end 203 of the latch member.

In this arrangement of parts, the cover blinds 24 are directly connected to, and controlled by, the trigger 32' to be opened by the initial movement of the trigger toward its shutter-releasing position so that the cover blinds will be opened by the time the shutter blades start to open; will remain open during the exposure and will close and remain closed during the cocking of the shutter. The connection which I have shown between the cover blinds and the trigger for this purpose is that shown in detail in my copending patent application Ser. No. 728,528, filed February 14, 1947, and since it forms no part of the present invention, other than being necessary to a shutter of the set type, it will be described herein only briefly. As in the automatic shutter above described, the cover blinds 24 are each pivoted at points 22 and are connected directly to the trigger 32' to be moved thereby in the following manner. The cover blinds are directly connected to the trigger by means of a pin 210 carried by the trigger and passing downwardly through slots 211 in the two blades which are inclined relative to one another, as best shown in Fig. 13. Thus, when the shutter trigger is moved counterclockwise to its released position, the pin 210 is moved inwardly and tends to pass between the two pivot points 22 whereupon the blades 24 are opened while the shutter trigger is moving the latch member 200 to a position to release the pin 84' on the blade ring 27. Consequently, when the trigger 32' is depressed, the cover blinds 24 are open and an exposure is made by movement of the main shutter blades 24.

As in the automatic shutter, described above, the flash synchronizer in this set type shutter includes a first switch comprising contact pin 68 carried by the lever 57 which is adapted to be moved into engagement with the contact lever 69 when the shutter is released and for the purpose of synchronizing flash lamps of the type having a characteristic "lag." As before, this contact lever is connected to one side of terminal T by a lead wire 70 while the pin 68 is grounded through the shutter mechanism to the other side of terminal T. As before, the time of closing of contacts 68 and 69 can be varied by adjustment of cam C which positions contacts 69 relative to the path of movement of contact pin 68 through the engagement of the end 74 of arm 73 with surface 75 on cam C.

The major change in the synchronizer of this set-type shutter, over that of the automatic shutter described above, is found in the second switch or that one used for synchronizing flash lamps having no "lag." In this instance, the second switch comprises a first contact which is the driving pin 64 carried by the blade ring and a second contact which is a spring finger 78'. The contact 78' is connected to the binding post 71 by a lead wire 216 so that it is connected to the same side of the terminal T as the contact 69 of the first switch while driving pin 64 is grounded through the shutter mechanism to the other side of the terminal T. Consequently, the first and second switches are connected in parallel in the flash circuit.

The end of contact 78' is rounded, as shown at 215, so that it can have a wiping engagement with driving pin 64 as the shutter operates to make an exposure. The end 215 of contact 78' is so disposed relative to the path of movement of the pin 64 that this switch is closed the instant the shutter blades are fully opened which is the condition necessary to synchronize flash lamps having no "lag." To prevent the second switch from being closed during the setting of the shutter, a bumper 217, made of any suitable insulating material, is mounted on lever 57 to move and hold contact 78' out of the path of movement of the pin 64 at all times, except when the shutter is operating to make an exposure. The shape of the end of lever 57 is modified over that shown in the automatic shutter of Fig. 1 to accommodate this bumper 217 and prevent the lever proper from engaging the rim 19 of the shutter case, or the lead wire 216, for purposes of limiting the normal position of lever 57.

As described above, when the blade ring is free to move counterclockwise, under the action of power spring 45 to produce an exposure, the driving pin 64 drives levers 62 and 57 together against the action of spring 57a by reason of lug 67 engaging the right side of lever 57 and, in so doing, moves lever 57 and inertia member 61 to move contact pin 68 into engagement with contact lever 69 and close the circuit prior to, or during, the opening movement of the shutter blades, depending upon the adjustment of lever 69. After the pin 64 slips off of the end 63 of drive lever 62, the levers 57 and 62 return to their normal position under the action of spring 57a, and in which position bumper 217 moves the end 215 of contact 78' out of the path of movement of pin 64, so that this second switch cannot be closed during the setting operation of the shutter. During setting of the shutter, pin 64 engages the end 63 of lever 62, but because of its one-way connection with lever 57 it does not drive this lever 57 against the action of spring 57a. Thus, the driving connection between the pin 64 and lever 57, afforded by lever 62, is, in effect, a one-way clutch connection which permits lever 57 to be driven by movement of the pin in only one direction. Consequently, since driving pin 64 serves as one contact of the second switch, this switch can be said to have a contact which is a part of the one-way clutch connection in question. Inasmuch as the pin 64 is made to serve two purposes, and do two different jobs, namely, drive lever 57 and serve as a contact for the second switch, a much more compact and simplified structure is provided than in the above-described automatic shutter arrangement. Furthermore, using the lever 57 to normally hold the second switch open, in addition to its normal function of serving as a contact of the first switch, eliminates a part required in the first-disclosed structure.

Although I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim as new and desire to secure by Letters Patent of the United States is:

1. In a photographic shutter having an associated flash synchronizing device, the combination with a plurality of pivoted shutter blades, an oscillatable blade ring adapted to move between cocked and released positions, a connection between said blade ring and said blades whereby the blades are opened and closed by movement of the blade ring between its cocked and released positions, a spring connected directly to said blade ring and normally acting to move it to its released position, a releasable latch for holding said blade ring in its latched position, a setting arm for manually moving said blade ring to its cocked position, a trigger for actuating said latch to release said blade ring from its cocked position, of a flash synchronizing device comprising a circuit including a normally open switch consisting of a pair of contacts, one of which is stationary and the other of which is movable and normally spaced from the stationary one, a one-way clutch connection between said blade ring and said movable contact for causing said blade ring to drive said movable contact into engagement with the stationary contact to close said circuit during the initial movement of said blade ring from its cocked position and allowing the blade ring to be moved from its released position to its cocked position without causing a movement of said movable contact from its normal switch-open position, a second switch connected in said circuit in parallel with said first switch and comprising a stationary contact and a movable contact which is a part of said one-way clutch connection and adapted to engage said stationary contact when the shutter is released and at the time shutter blades reach their fully open position, and means for disabling said first switch when said second switch is to be used to control said circuit.

2. In a photographic shutter of the set type having a built-in flash synchronizing device, the combination with a plurality of pivoted shutter blades, an oscillatable blade controller ring movable from a cocked to a released position and connected to said blades so that movement of said ring in one direction causes the blades to open and close, a spring connected directly to said blade ring for driving the same, means for manually moving said ring to its cocked position, of a flash synchronizing device comprising a circuit including a normally open switch consisting of a pair of contacts, one of said contacts being a stationary member, the other of said contacts being a pivoted lever normally spring-pressed from engagement with said stationary contact, means for moving said movable contact into engagement with the stationary one upon movement of the blade ring from its cocked to its released positions, but not during movement of the ring in a reverse direction to a cocked position, said means including a driving pin fixed to said ring, an auxiliary lever pivoted to said movable contact and including a portion adapted to extend into the path of movement of said driving pin, a connection between said auxiliary lever and said movable contact which permits the lever to pivot relative to said contact when engaged by said driving pin as the blade ring is moving from its released position to its cocked position but which prevents relative movement between the lever and contact when engaged by said driving pin when the blade ring is moving from its cocked position, whereby this movement of the blade ring causes the second contact to move into switch-closing engagement with the stationary one, the parts being so arranged that the switch is closed during the initial part of the movement of the blade ring from its cocked position, a second switch connected in said circuit in parallel with the first switch and comprising a first contact which is said driving pin on the blade ring, and a second contact which is disposed in the path of movement of said pin to be wiped thereby as the blade ring is moving from its cocked position, said second contact disposed so that it is engaged by said pin the moment the shutter blades reach their full-open position, and means for disabling said first switch when said second switch is used to control said circuit.

3. A photographic shutter, according to claim 2, in which there are means for moving and holding the second contact of said second switch out of the path of movement of said driving pin during movement of the blade ring to its cocked position, whereby said circuit is not completed during the cocking of the shutter.

4. A photographic shutter, according to claim 2, characterized by the fact that the second contact of said second switch is engaged by an insulating portion on the movable contact of the first switch and moved to, and held in, a position out of the path of movement of said driving pin during the portion of the cocking movement of the blade ring when the driving pin is passing said second contact to prevent closing of this second switch during the cocking of the shutter.

CARL C. FUERST.

REFERENCES CITED

The following references are of record in the file of this patent:

UNITED STATES PATENTS

| Number | Name | Date |
|---|---|---|
| 2,145,917 | Boesser | Feb. 7, 1939 |
| 2,238,453 | Small | Apr. 15, 1941 |
| 2,256,354 | Riddell | Sept. 16, 1941 |
| 2,319,086 | Riddell | May 11, 1943 |
| 2,326,077 | Steiner | Aug. 3, 1943 |
| 2,358,941 | Schwarz | Sept. 26, 1944 |
| 2,404,526 | Pirwitz | July 23, 1946 |